United States Patent
Dixon et al.

(10) Patent No.: US 10,503,662 B2
(45) Date of Patent: Dec. 10, 2019

(54) SYSTEMS, APPARATUSES, AND METHODS FOR IMPLEMENTING TEMPORARY ESCALATED PRIVILEGE

(75) Inventors: Martin G. Dixon, Portland, OR (US); Gilbert Neiger, Portland, OR (US); Robert S. Chappell, Portland, OR (US); Scott D. Rodgers, Hillsboro, OR (US); Barry E. Huntley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 13/539,132

(22) Filed: Jun. 29, 2012

(65) Prior Publication Data
US 2014/0006739 A1  Jan. 2, 2014

(51) Int. Cl.
*G06F 12/14* (2006.01)

(52) U.S. Cl.
CPC .......... *G06F 12/14* (2013.01); *G06F 12/1491* (2013.01)

(58) Field of Classification Search
CPC ....................................................... G06F 12/14
USPC .......................................................... 711/162
See application file for complete search history.

(56) References Cited

U.S. PATENT DOCUMENTS

| | | | | |
|---|---|---|---|---|
| 5,469,556 A * | 11/1995 | Clifton | ................ | G06F 12/1483 709/226 |
| 5,983,370 A * | 11/1999 | Anderson | ........... | G06F 11/0772 711/201 |
| 7,130,951 B1 * | 10/2006 | Christie et al. | ................ | 710/261 |
| 2002/0042874 A1 * | 4/2002 | Arora | .................. | G06F 9/30079 712/229 |
| 2002/0129299 A1 * | 9/2002 | McKee | ................... | G06F 9/468 714/38.13 |
| 2004/0177269 A1 * | 9/2004 | Belnet et al. | ................. | 713/200 |
| 2005/0076186 A1 * | 4/2005 | Traut | ................ | 712/1 |
| 2011/0296202 A1 * | 12/2011 | Henry et al. | ................. | 713/190 |
| 2012/0036341 A1 * | 2/2012 | Morfey et al. | ................ | 712/229 |

* cited by examiner

*Primary Examiner* — Gautam Sain
(74) *Attorney, Agent, or Firm* — Nicholson De Vos Webster & Elliott LLP

(57) ABSTRACT

Embodiments of systems, apparatuses, and methods for temporarily allowing access to a lower privilege level from a higher privilege level.

12 Claims, 13 Drawing Sheets

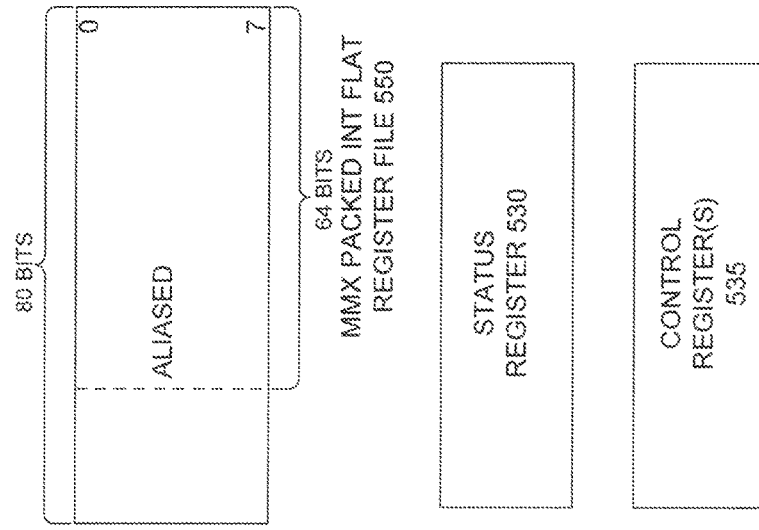
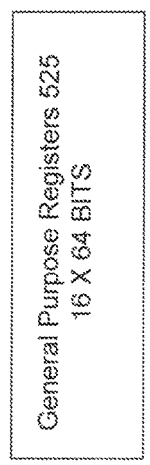
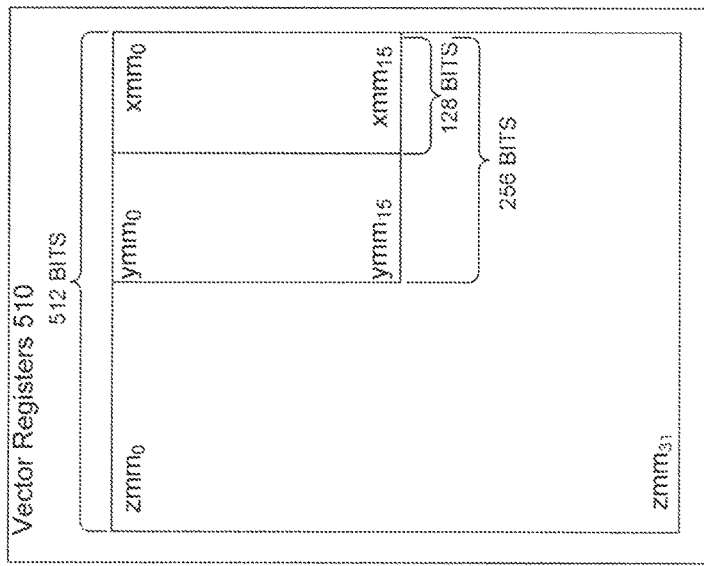
FIG. 5

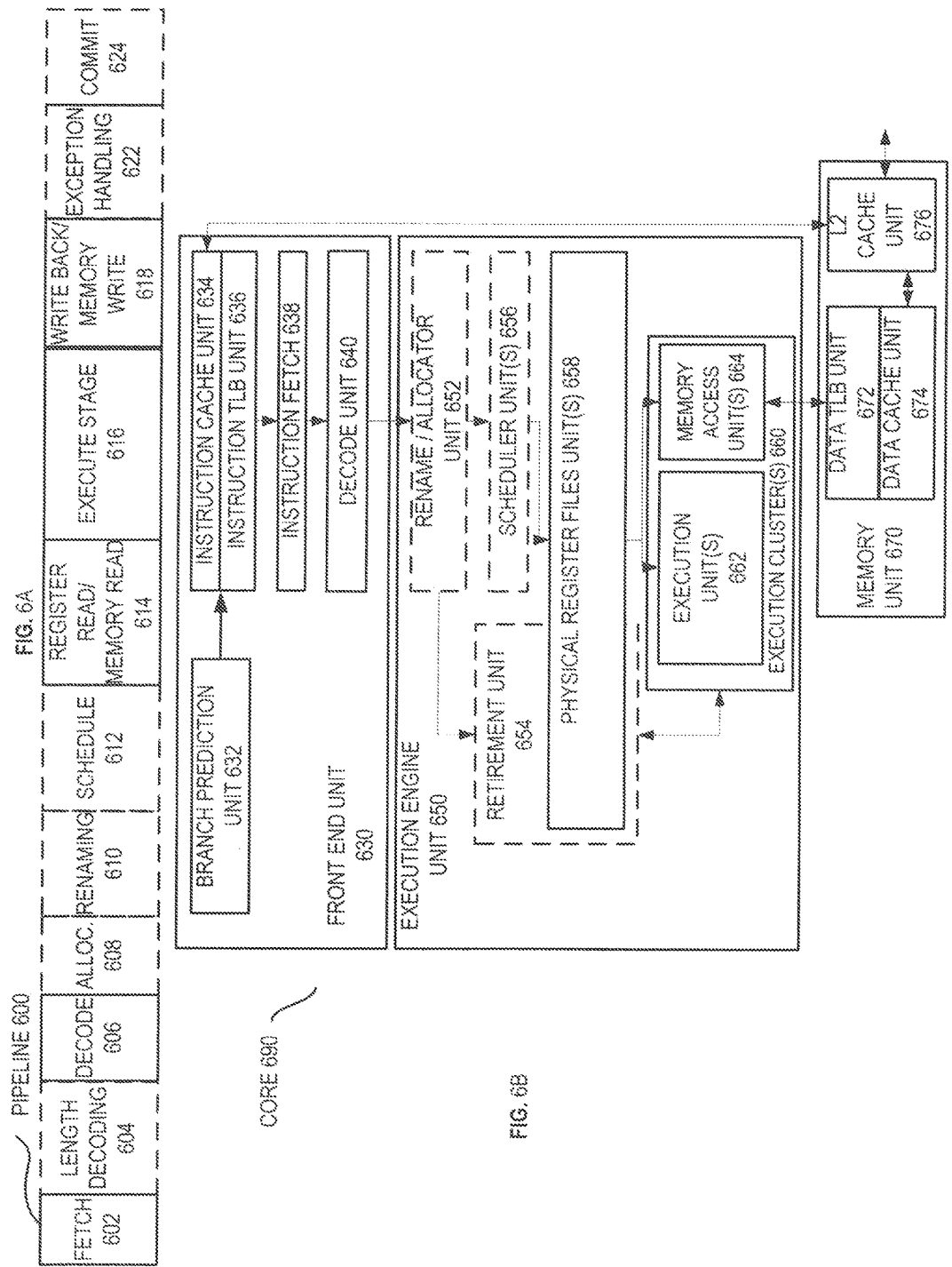

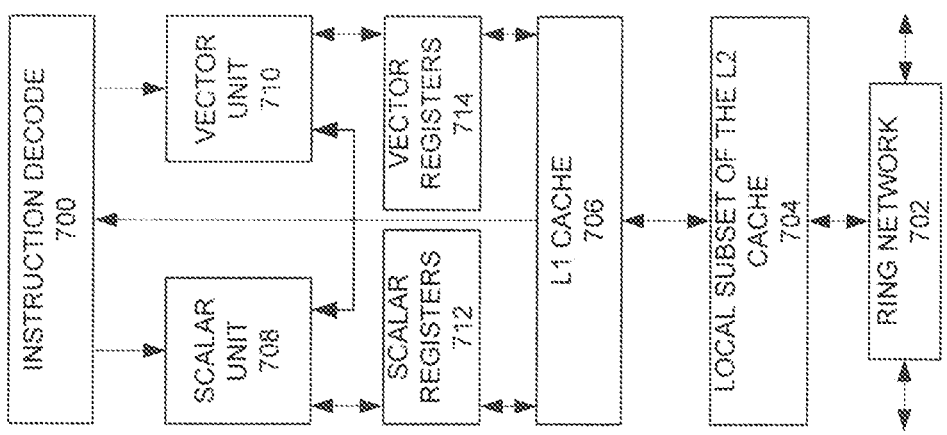
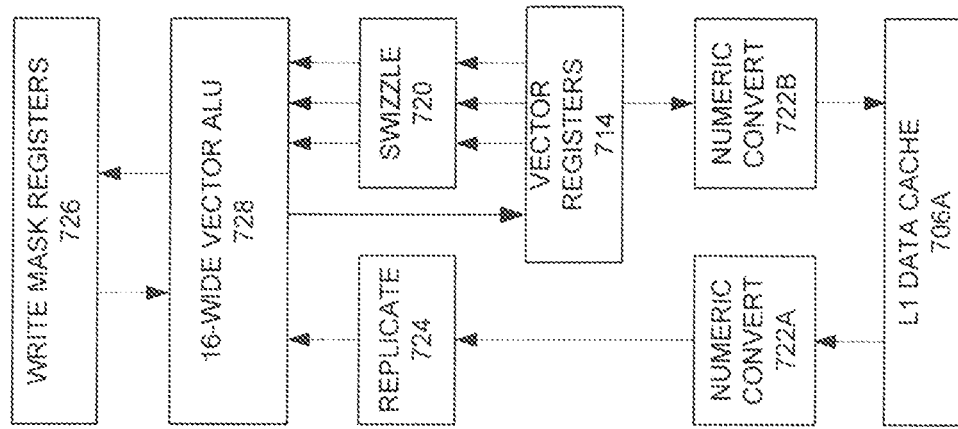

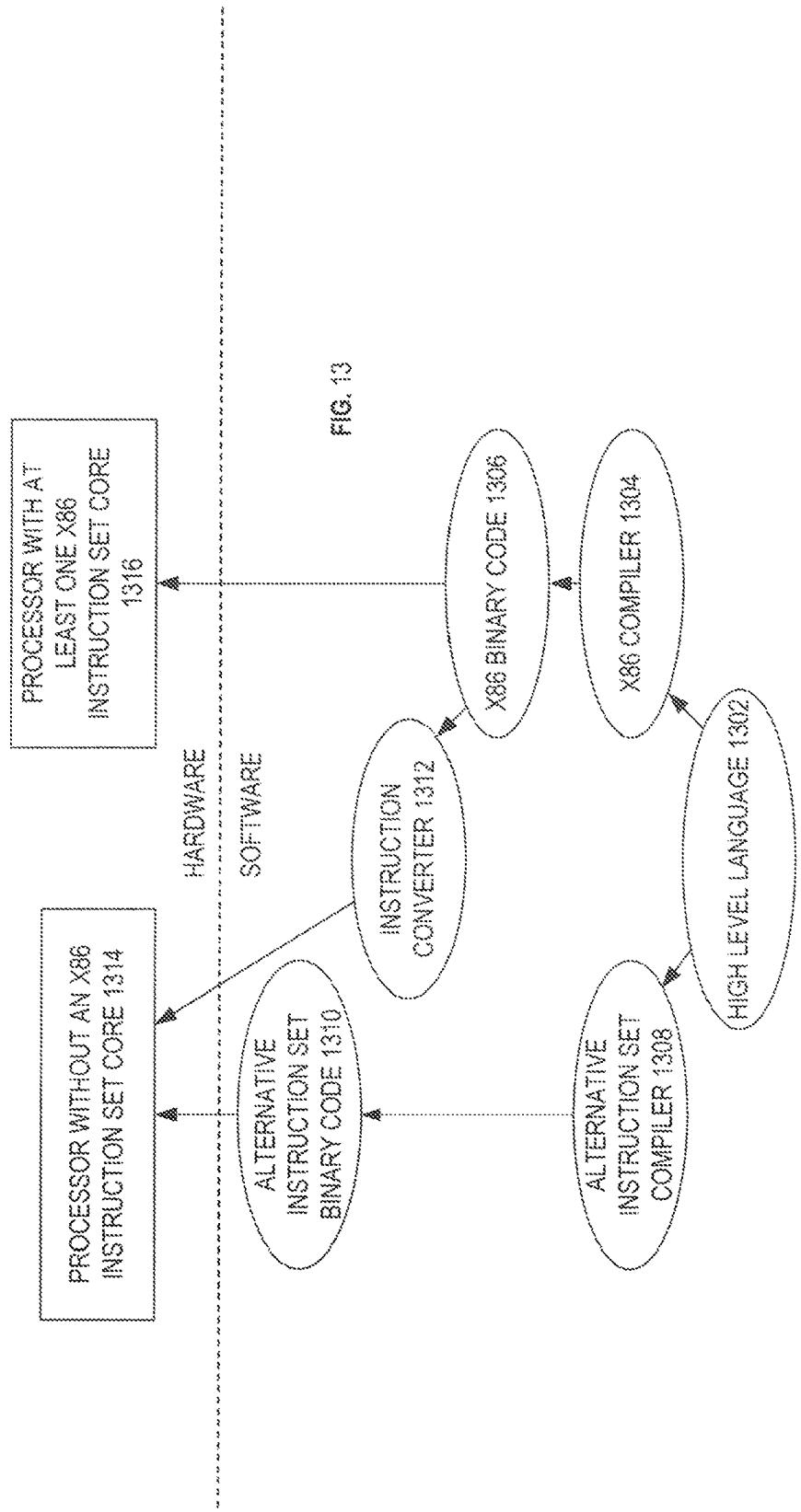

US 10,503,662 B2

SYSTEMS, APPARATUSES, AND METHODS FOR IMPLEMENTING TEMPORARY ESCALATED PRIVILEGE

FIELD OF INVENTION

The field of invention relates generally to computer processor architecture, and, more specifically, to permitting temporary access from one privilege level to another.

BACKGROUND

In many modern computing designs a concept of privilege is used to define access to particular data and functions. For example, some computer processor designs utilize privilege rings wherein the most significant ring (typically ring 0) is reserved for the kernel. This level is at times called the supervisor or kernel mode. Subsequent rings (such as rings 1-3) are used for device drivers and/or applications (with applications belong to the least significant privileged level or ring). The least significant level is at times called the user mode. FIG. 1 illustrates an example of privilege rings.

While a processor (such as a CPU, GPU, APU, or some hybrid therefrom) may support several different levels that does not necessarily mean that the operating system will utilize all of the levels. For example, some Microsoft Windows versions only utilize the most and least significant levels.

When in the most significant privilege level, access to levels of lesser privilege significance should be done in a controlled fashion. In UNIX operating system environments, copyin and copyout functions are used for this purpose. For example, using copyin bytes of data are copied from the user space to the kernel space and the opposite occurs when copyout is used.

BRIEF DESCRIPTION OF THE DRAWINGS

The present invention is illustrated by way of example and not limitation in the figures of the accompanying drawings, in which like references indicate similar elements and in which:

FIG. 5 is a block diagram of a register architecture according to one embodiment of the invention.

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention.

FIGS. 7A-B illustrate a block diagram of a more specific exemplary in-order core architecture, which core would be one of several logic blocks (including other cores of the same type and/or different types) in a chip

FIG. 13 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

Described below are novel and non-obvious mechanisms for allowing access to lesser privileged data from higher privileged levels. In particular, embodiments of the mechanisms allow access to user mode pages (for example, current privilege level 3 (CPL3) from another level such as the kernel level (for example, CPL0) based upon a configurable indication of access permissions is set in a storage location of the processor.

Portions of an exemplary register architecture are illustrated in FIG. 5. In this architecture, described in greater detail below, there are several different registers that may be utilized to temporarily indicate privilege level access permissions. Typically, the status register 550 includes a flag that is set to indicate these access permissions from the higher privilege level to a lower privilege level. In some x86 architectures the EFLAGs register (which is a status register) includes configurable flag for this indication. This flag could be one that is not currently used (bit 15 or 22-31 for example) or an existing flag such as alignment check (AC), which is bit 18. This bit may be set to 1 or 0 for the indication depending upon the implementation. AC is relevant in CPL3 which makes it interoperable with existing operating systems. Since each of these registers only temporarily stores values, the indication of privilege level access is also temporary.

Below are several different flows illustrating the use of a configurable privilege level access indication. While these illustrations typically discuss EFLAGs as what stores the indication, as noted above, other registers or indications may be used. Additionally, while not always explicitly stated, these flows are depicted from the processor's point of view as such these flows depict a program's execution on a processor.

Figure 1:
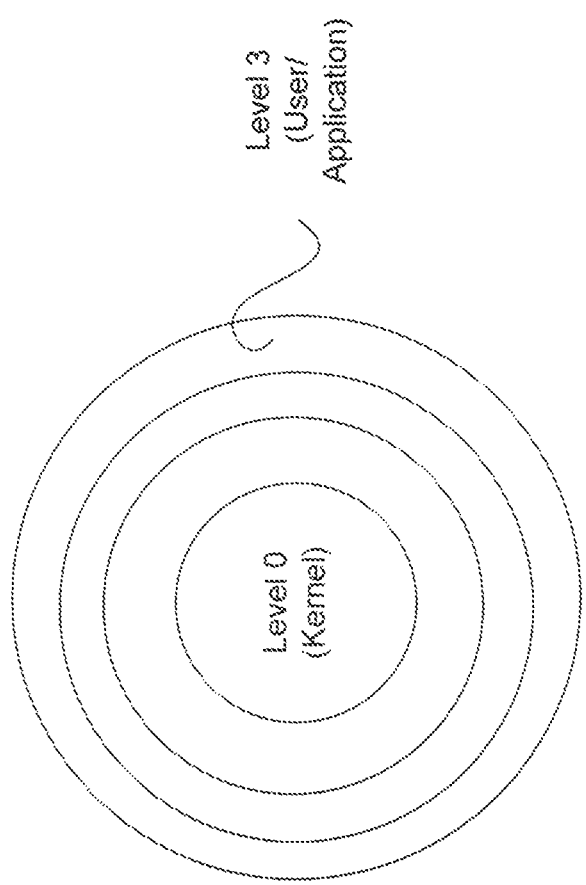
FIG. 1 illustrates an exemplary illustration of privilege levels.
Figure 2:
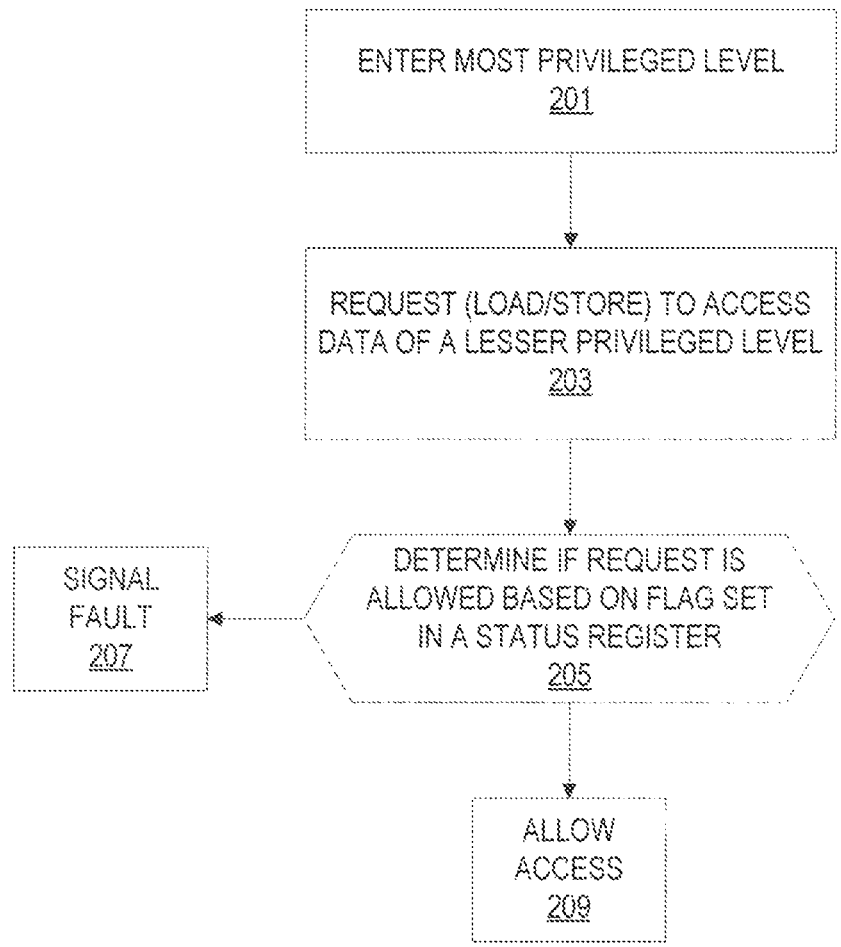
FIG. 2 illustrates an embodiment of a flow using temporary privilege level indication.

FIG. 2 illustrates an embodiment of a flow using temporary privilege level indication. In this example, the program being executed enters a higher privilege level (such as CPL0) at 201. There are numerous ways to enter this level, and in most instances this occurs because the processor has received an instruction telling it to enter this level.

At some point later in time, a load or store request is made in the program (and received by the processor) to access data in the lower privilege level is made at 203. In other words, a request is made to access a lower privilege level when in a higher privilege level. In prior processors, this request would not be allowed. Moreover, this request would not be allowed had the indication not been set.

A determination of if the privilege level access indication has been set, and therefore the request is allowed, is made at 205. For example, in some embodiments, the EFLAGs register is checked to see if the indication has been set.

If the indication is not set, then a fault that indicates that an illegal access has been attempted is signaled at 207. This may be a page fault or a general protection fault depending upon the implementation.

If the indication is set, then the access is allowed at 209 and all loads/stores from the higher privileged ring are allowed to pages that are set to the lower privilege level.

Figure 3:
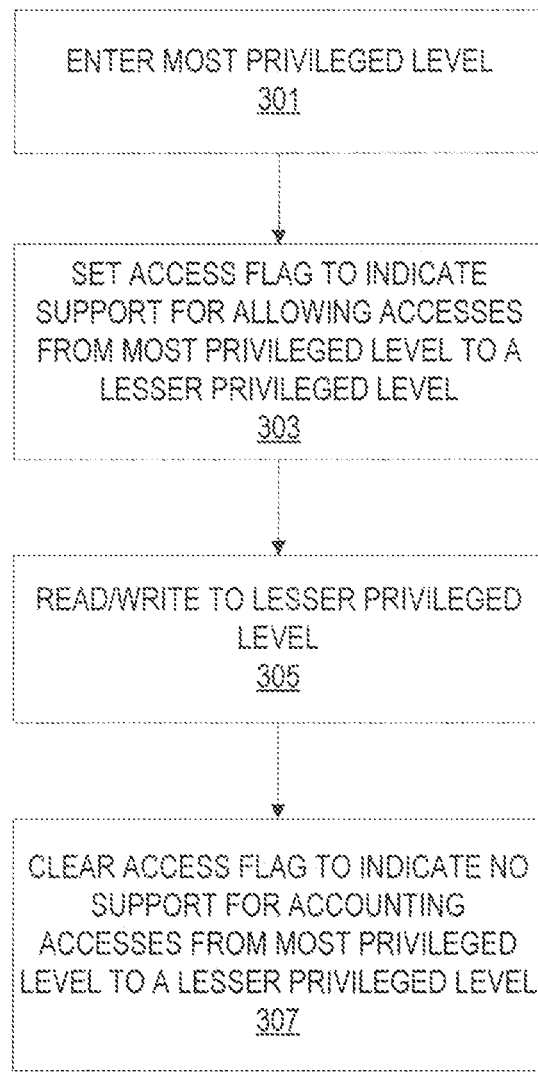
FIG. 3 illustrates another embodiment of a flow using temporary privilege level indication.

FIG. 3 illustrates another embodiment of a flow using temporary privilege level indication. In this example, the program being executed enters a higher privilege level (such as CPL0) at 301. There are numerous ways to enter this level, and in most instances this occurs because the processor has received an instruction telling it to enter this level.

At 303, an access flag (indication) is set to indicate support for allowing access from a most privileged level (or another high privilege level) to a lesser privileged level. There are several ways to set this flag.

In an embodiment, this flag is set by using a push/pop mechanism (such as PUSHF/POPF). For example, the register is pushed onto the stack, modified, and then popped back. In the EFLAGs scenario, this may be accomplished using a PUSHF instruction to push EFLAGs onto the stack, a store instruction (or any modifying instruction) to modify EFLAGs to change the indication to allow, and a POPF instruction to bring the EFLAGs register back off of the stack.

In another embodiment, this flag is cleared/set using a more dedicated instruction or instructions. For example, a CLAC (clear access flag) may be used to clear the indication (and thereby not allow accesses) or a STAC (set access flag) instruction may be used to set the indication (and thereby allow accesses).

A read or write access request is made to the lesser privileged level from the higher privileged level at 305 and as all loads/stores from the higher privileged ring are allowed to pages that are set to the lower privilege level this access request is allowed.

At 307, the access flag is cleared to indicate that there is no support for allowing accesses from a more privileged page. In the EFLAGs scenario, this may be accomplished using a PUSHF instruction to push EFLAGs onto the stack, a store instruction (or any modifying instruction) to modify EFLAGs to change the indication to not allow, and a POPF instruction to bring the EFLAGs register back off of the stack. A CLAC instruction may also be used.

As noted above, each of these program steps are received by the processor to execute.

Figure 4:
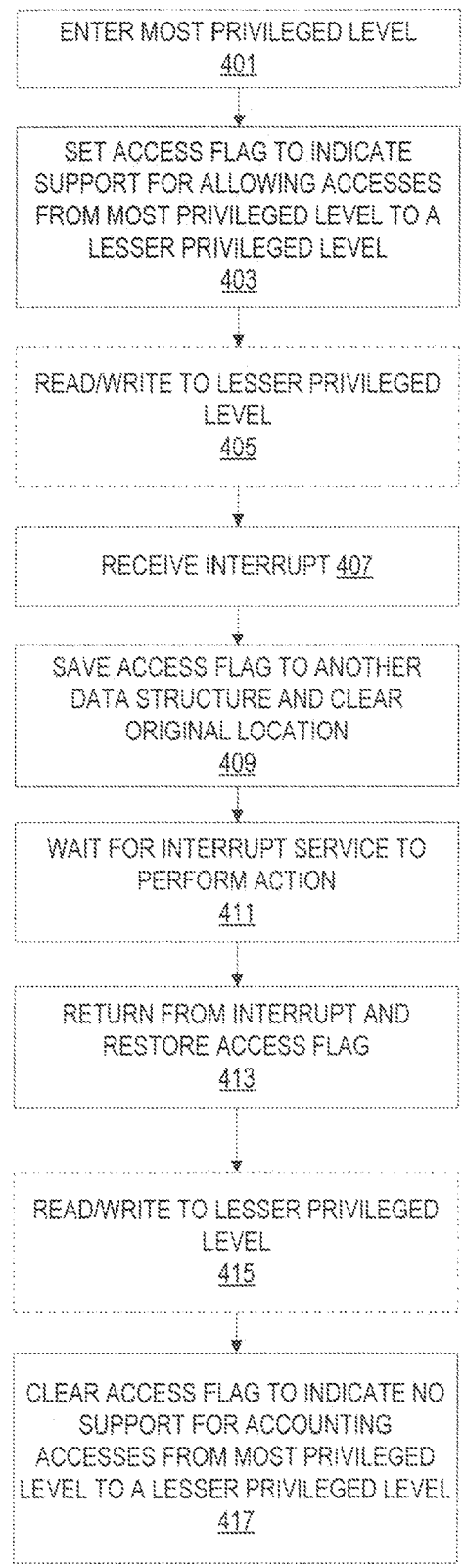
FIG. 4 illustrates another embodiment of a flow using temporary privilege level indication.

FIG. 4 illustrates another embodiment of a flow using temporary privilege level indication. In this example, the program being executed enters a higher privilege level (such as CPL0) at 401. There are numerous ways to enter this level, and in most instances this occurs because the processor has received an instruction telling it to enter this level.

At 403, an access flag (indication) is set to indicate support for allowing access from a most privileged level (or another high privilege level) to a lesser privileged level. There are several ways to set this flag.

In an embodiment, this flag is set by using a push/pop mechanism (such as PUSHF/POPF). For example, the register is pushed onto the stack, modified, and then popped back. In the EFLAGs scenario, this may be accomplished using a PUSHF instruction to push EFLAGs onto the stack, a store instruction (or any modifying instruction) to modify EFLAGs to change the indication to allow, and a POPF instruction to bring the EFLAGs register back off of the stack.

In another embodiment, this flag is cleared/set using a more dedicated instruction or instructions. For example, a CLAC (clear access flag) may be used to clear the indication (and thereby not allow accesses) or a STAC (set access flag) instruction may be used to set the indication (and thereby allow accesses).

A read or write access request may be made to the lesser privileged level from the higher privileged level at 405 and as all loads/stores from the higher privileged ring are allowed to pages that are set to the lower privilege level this access request is allowed.

At some point during the execution of the program an interrupt is received at 407. At this point, because an interrupt handler will be used, it may be desirable to reset the access indication so that unwanted accesses are not permitted.

At 409, the access indication is saved to another data structure (such as being placed on the stack, placed into a different register, saved to memory, etc.) to potentially be retrieved after the interrupt is handled. In an EFLAGS embodiment, the contents of EFLAGS is saved out, but will available to be restored when an interrupt occurs. However, the EFLAGS register itself will still need to be cleared.

After the interrupt service is performed at 411, the access indication should be restored at 413. Restoring this indication could mean popping from the stack, retrieving from another register or memory, etc.

A read or write access request may be made to the lesser privileged level from the higher privileged level at 415 and as all loads/stores from the higher privileged ring are again allowed to pages that are set to the lower privilege level this access request is allowed.

At 417, the access flag is cleared to indicate that there is no support for allowing accesses from a more privileged page. In the EFLAGs scenario, this may be accomplished using a PUSHF instruction to push EFLAGs onto the stack, a store instruction (or any modifying instruction) to modify EFLAGs to change the indication to not allow, and a POPF instruction to bring the EFLAGs register back off of the stack. A CLAC instruction may also be used. As noted above, each of these program steps are received by the processor to execute. Additionally, while not explicitly illustrated, the check of 205 may be performed upon an access request to the lower level and the signaling of 207 may be done if for some reason the request is not allowable.

Exemplary systems, architectures, and pipelines are detailed below. Embodiments of the instruction(s) may be executed on such systems, architectures, and pipelines, but are not limited to those detailed.

Exemplary Register Architecture

FIG. 5 is a block diagram of a register architecture 500 according to one embodiment of the invention. In the embodiment illustrated, there are 32 vector registers 510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Status register 530 stores a collection of flag bits for a processor. The EFLAGs register described earlier is an example. In some embodiments, this register 530 includes condition code information.

Control register(s) 535 changes or controls the behavior of the processor. In some embodiments, this register is used to store the indication detailed above.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 612-bits wide per direction.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 16-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input. Write mask registers 726 allow predicating resulting vector writes.

Processor with Integrated Memory Controller and Graphics

Figure 8:
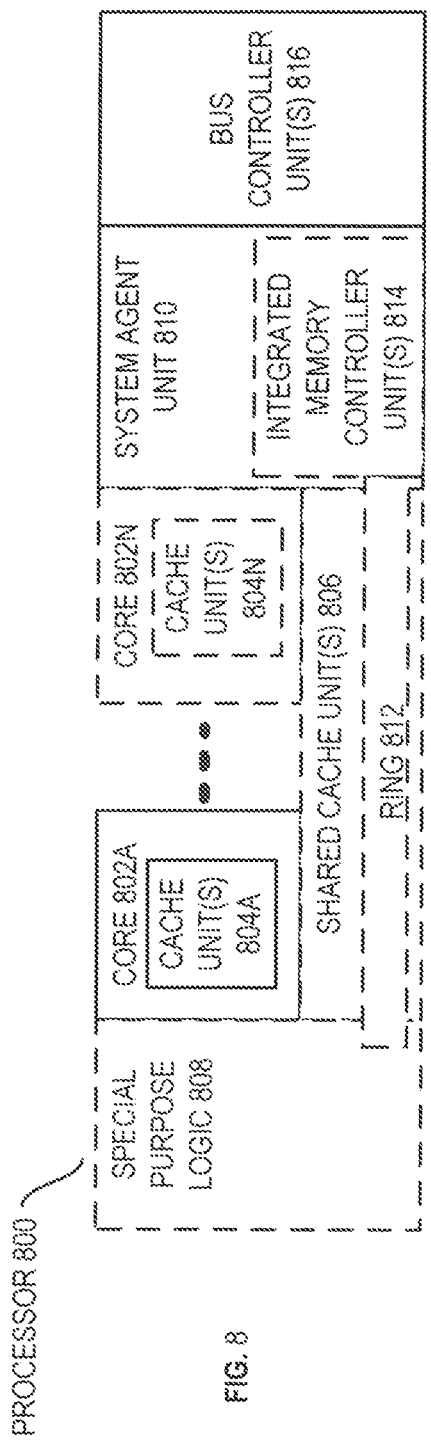
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
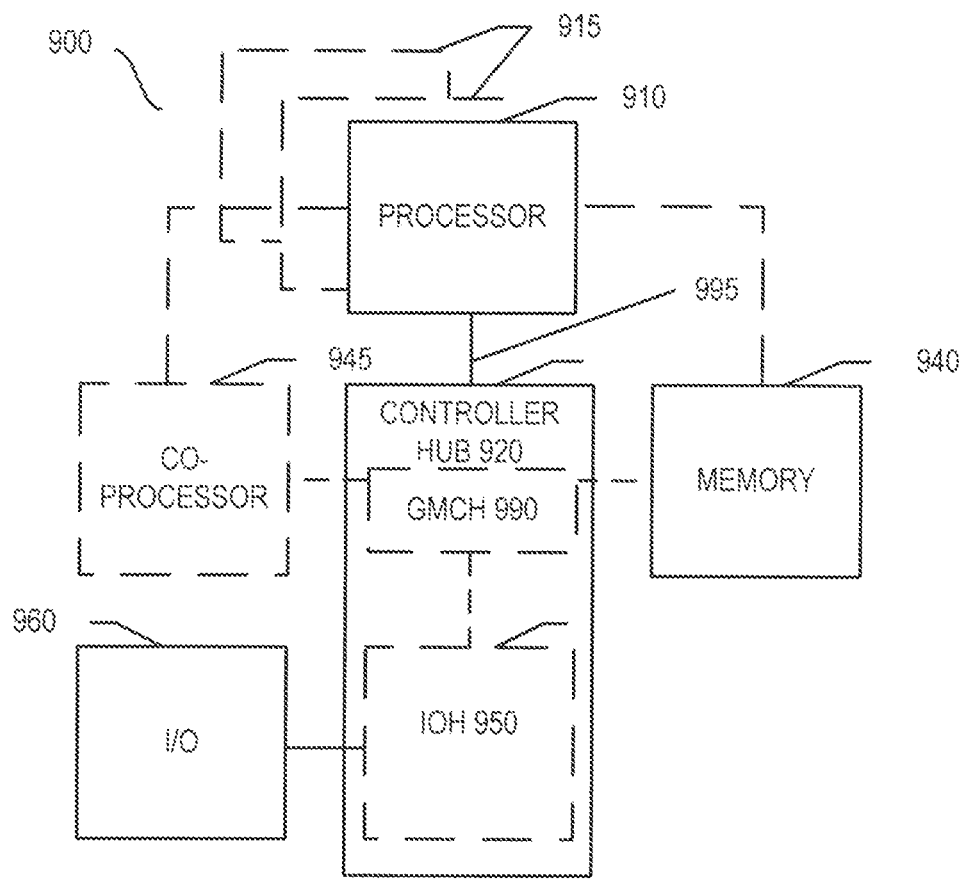
FIG. 9 is a block diagram of a first more specific exemplary system in accordance with an embodiment of the present invention.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
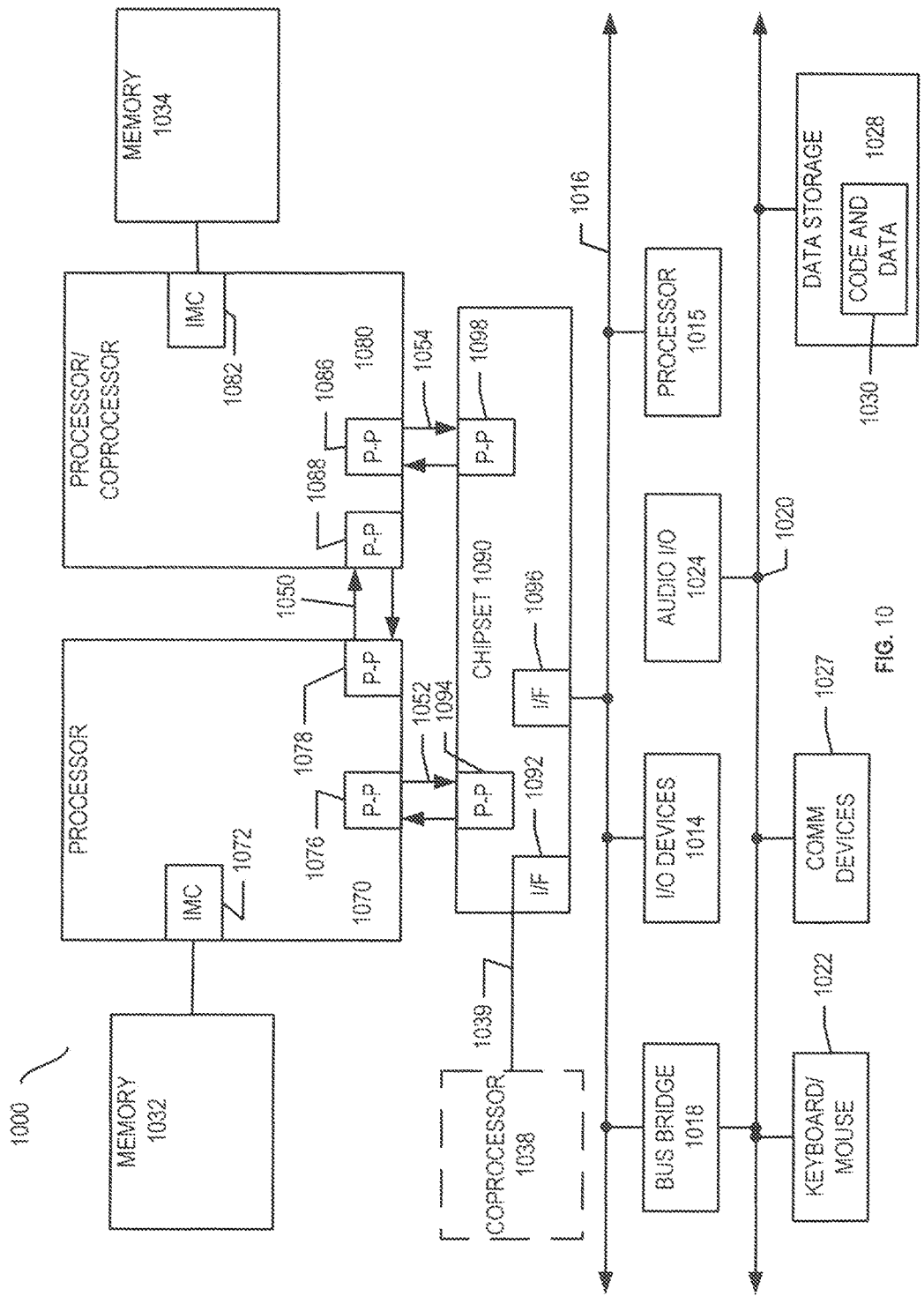
FIG. 10 is a block diagram of a second more specific exemplary system in accordance with an embodiment of the present invention.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Figure 11:
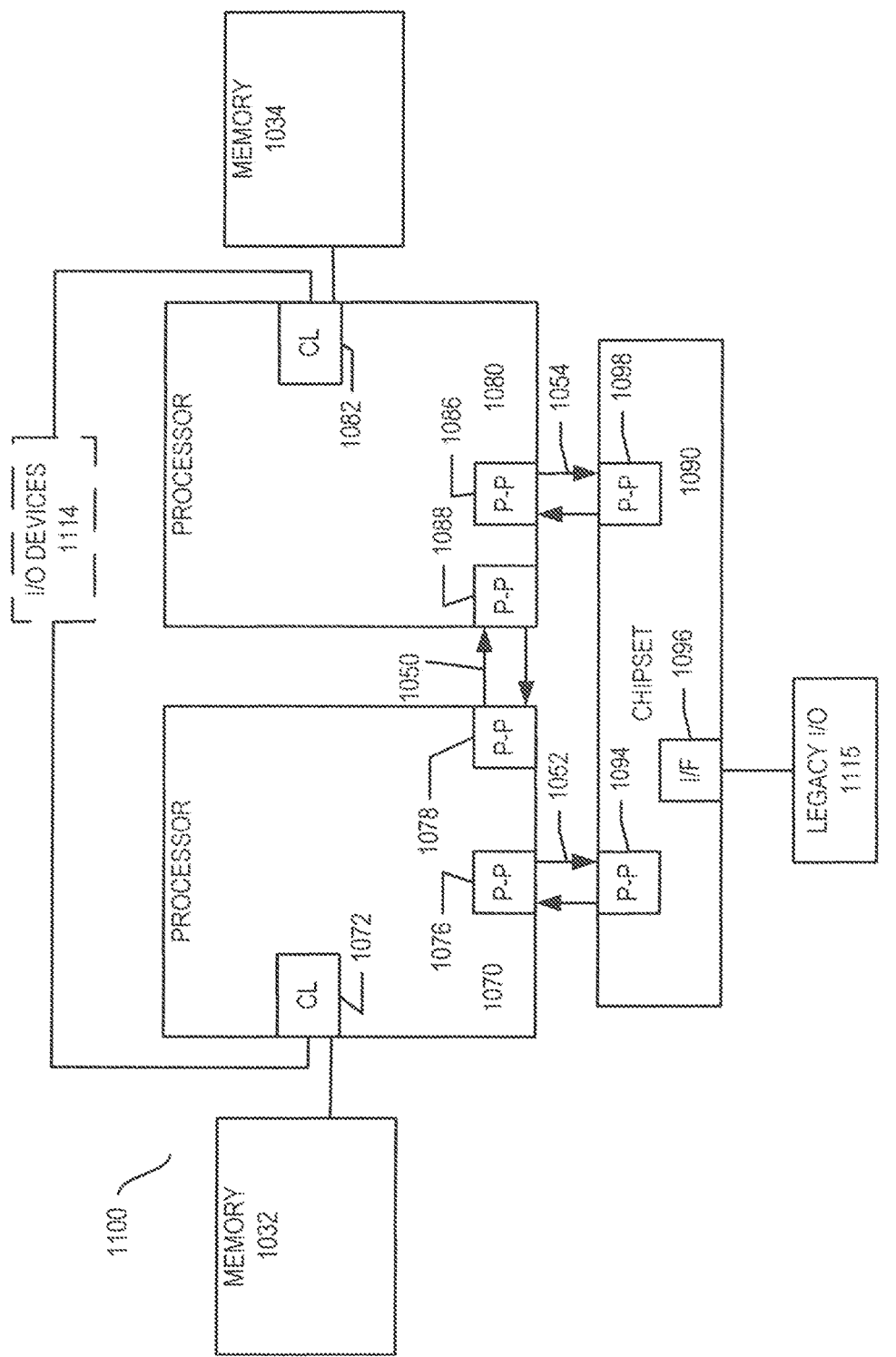
FIG. 11 is a block diagram of a system in accordance with one embodiment of the present invention

Referring now to FIG. 11, shown is a block diagram of a second more specific exemplary system 1100 in accordance with an embodiment of the present invention. Like elements in FIGS. 14 and 15 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
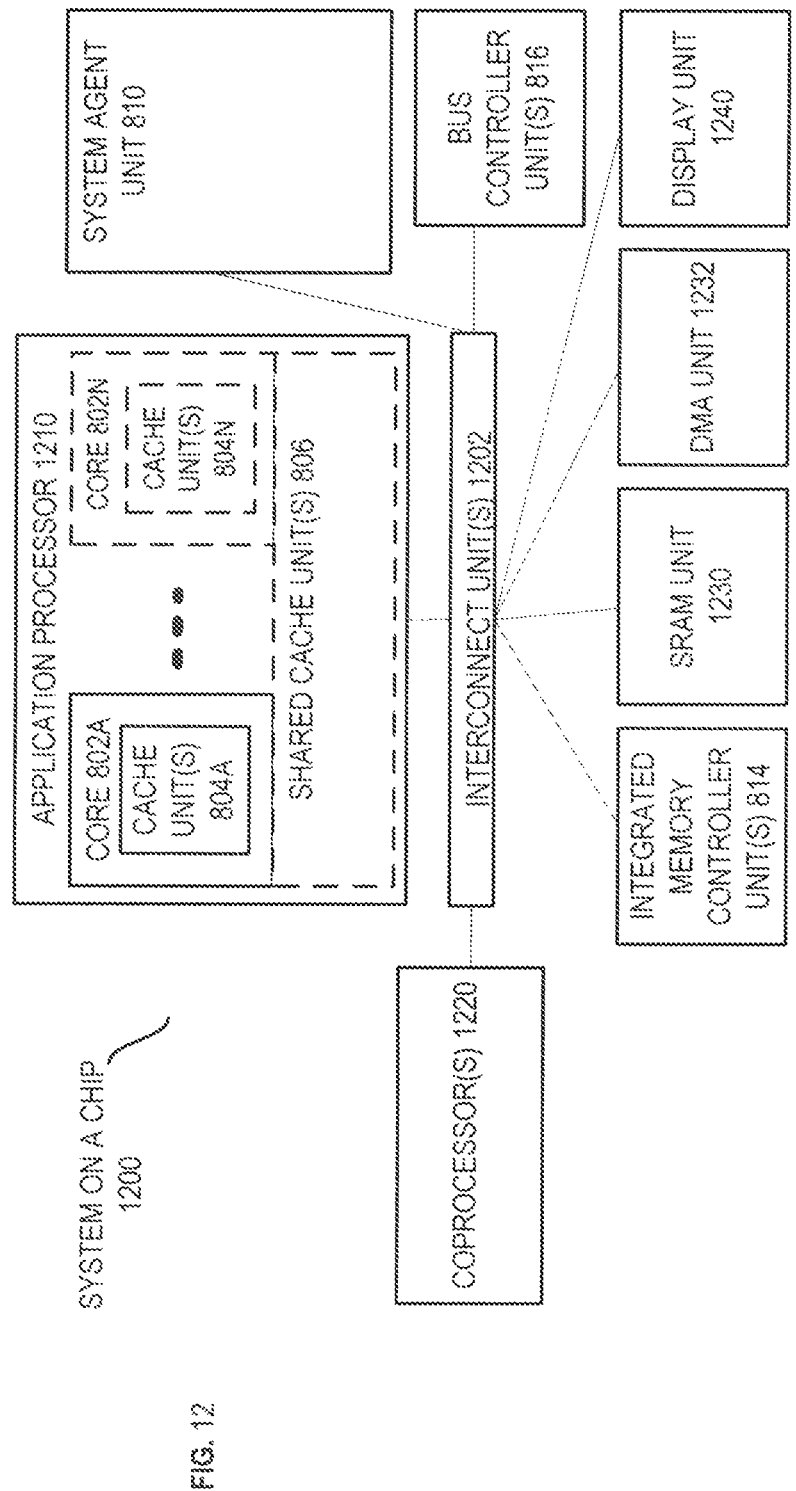
FIG. 12 is a block diagram of a SoC in accordance with an embodiment of the present invention.

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 202A-N and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

The following clauses and/or examples pertain to further embodiments. Specifics in the clauses and/or examples may be used anywhere in one or more embodiments.

In an embodiment, a processor comprises execution logic to execution one or more instructions of a program, wherein the program operates at different privilege levels including a higher privilege level and a lower privilege level and storage for an indication of when the program is operating at the higher privilege level whether or not the program is allowed to access data associated with the lower privilege level.

Embodiments of the processor further include the storage for an indication of when the program is operating at the higher privilege level whether or not the program is allowed to access data associated with the lower privilege level is an EFLAGS register. Additionally, in some embodiments, bit 18 of the EFLAGS register is used for the indication and in others a reserved bit of the EFLAGS register is used for the indication.

In some embodiments, the storage for an indication of when the program is operating at the higher privilege level whether or not the program is allowed to access data associated with the lower privilege level is a status register.

In at least one embodiment, the higher privilege level is a kernel level and the lower privilege level is a user mode. Additionally, the data to be accessed is in a user mode page.

Embodiments of a method of using temporary privilege while executing a program in a processor may include entering a higher privileged level, requesting access of data associated with a lower privilege level, determining if the access request for data associated with a lower privilege level is allowed based upon an indicator set in the processor, denying the access request when the indicator does not indicate that such a request should be granted, and allowing the access request when the indicator does indicate that such a request should be granted.

Embodiments of the method may further include setting the indicator by pushing the register to a stack, modifying the contents of the register, and popping the register off of the stack in this order. Additionally, setting the indicator may be accomplished by executing a set access flag instruction.

In some embodiments of the method, the indicator is stored in a status register. In more particularity, the status register may be EFLAGS. When using EFLAGs, the indicator is stored in some embodiments in bit 18 and in others in a reserved bit.

In one or more of the embodiments, upon denying the access request when the indicator does not indicate that such a request should be granted, signaling a page fault or a general protection fault.

What is claimed is:

1. A processor comprising:
   execution circuitry to execute one or more instructions of a program, wherein the program is to operate at different privilege levels including a most privileged level and a lower privilege level;
   storage for an indication of, when the program is operating at the most privileged level, whether or not the program is temporarily allowed to access data associated with the lower privilege level without changing privilege levels, wherein the storage for an indication of when the program is operating at the most privileged level whether or not the execution circuitry is allowed to access data associated with the lower privilege level is an EFLAGS register and the indication is bit 18.

2. The processor of claim 1, wherein the most privileged privilege level is a kernel level and the lower privilege level is a user mode.

3. The processor of claim 2, wherein the data to be access is in a user mode page.

4. The processor of claim 1, wherein the indication is to be reset upon an interrupt.

5. A method of using temporary privilege while executing a program in a processor comprising:
   entering a higher privilege level; and
   when in the higher privilege level,
      requesting access of data associated with a lower privilege level when in the higher privilege level,
      determining if the access request for data associated with a lower privilege level is allowed based upon an indicator set in bit 18 of an EFLAGS register of the processor,
      denying the access request when the indicator does not indicate that such a request should be granted, and
      allowing the access request when the indicator does indicate that such a request should be granted.

6. The method of claim 5, further comprising:
   setting the indicator by pushing the register to a stack, modifying the contents of the register, and popping the register off of the stack in this order.

7. The method of claim 6, further comprising:
   setting the indicator by executing a set access flag instruction.

8. The method of claim 6, further comprising:
   upon denying the access request when the indicator does not indicate that such a request should be granted, signaling a page fault.

9. The method of claim 6, further comprising:
   upon denying the access request when the indicator does not indicate that such a request should be granted, signaling a general protection fault.

10. A non-transitory tangible machine-readable storage medium including instructions which when executed by a processor cause the processor to perform a method, the method comprising:
    entering a higher privileged level; and
    when in the higher privilege level,
       requesting access of data associated with a lower privilege level when in the higher privilege level,
       determining if the access request for data associated with a lower privilege level is allowed based upon an indicator set in bit 18 of an EFLAGS register of the processor,
       denying the access request when the indicator does not indicate that such a request should be granted, and
       allowing the access request when the indicator does indicate that such a request should be granted.

11. The method of claim 10, further comprising:
    setting the indicator by pushing the register to a stack, modifying the contents of the register, and popping the register off of the stack in this order.

12. The method of claim 10, further comprising:
    upon denying the access request when the indicator does not indicate that such a request should be granted, signaling a page fault.

* * * * *